Patented June 20, 1939

2,163,243

UNITED STATES PATENT OFFICE 2,163,243

PLASTIC COMPOSITION

John A. Kenney, Plainfield, N. J., assignor to The Barrett Company, New York, N. Y., a corporation of New Jersey No Drawing. Application April 6, 1936,
Serial No. 72,977

2 Claims. (Cl. 260—3)

This invention relates to plastic compositions and has for its object to provide a plastic mass of the "plastic wood" type which may be used for a number of purposes; for example, filling screw and nail holes, openings at joints, preparing and repairing moldings and carvings, as a crack filler for floors and walls, etc., and which plastic mass has the desirable properties of being resistant to acids, alkalies and water and as compared with other plastic wood compositions tends to adhere more tenaciously to surfaces to which it is applied.

The invention, in brief, is directed to a plastic composition of a doughy or putty-like consistency comprising a finely divided filler, preferably wood flour and a solution of a resin of the paracoumarone type and another resin soluble in an organic solvent, solutions of which other resin dry quickly to form a hard tough mass, and which composition, upon exposure to the atmosphere sets to form a hard tough mass of substantially the rigidity and solidity of wood.

As the resin of the paracoumarone type, paracoumarone resin having a melting point of from about 80° C. to about 200° C., preferably about 125° to 160° C., may be employed. Paracoumarone resin, as is well known, is made by polymerizing constituents such as coumarone and indene present in coal tar naphtha. Resins made by the polymerization of distillates obtained from petroleum and natural gas including cracked distillates have properties similar to the properties of paracoumarone resin. The term "paracoumarone resin-like material" as used in the claims herein is intended to be a generic term to include both paracoumarone resin and resin obtained by the polymerization of the polymerizable constituents of petroleum distillates.

The paracoumarone resin may be dissolved in toluol or any other suitable solvent such as benzol, other coal tar solvents, ester solvents or petroleum naphthas which have relatively high evaporation rates. If petroleum naphthas are employed they should be used sparingly. As the other resin mixed with the paracoumarone resin, chlorinated rubber, containing from 50% to 70% chlorine, such as the resin now obtainable under the name "Tornesit", may be employed.

In carrying the invention into effect in one form, by way of example, 6 pounds of paracoumarone resin of 135° C. melting point, were dissolved in a gallon of toluol. 6 pounds of chlorinated rubber, containing about 67% chlorine, were dissolved in a gallon of toluol. The two solutions were then mixed and dry wood flour added to this mixture until a doughy, putty-like mass was formed which could readily be spread with a putty knife and worked into cracks. In order to obtain such consistency of the mass it was found in one case necessary to add an amount of wood flour which by weight was equal to the weight of the solution. The mixture may be treated in a kneading machine until it is of uniform consistency.

A plastic composition prepared as described above hardens quickly when exposed to the air to substantially the rigidity and solidity of wood and the resultant mass is substantially unaffected by water, alkalies or acids, is substantially non-inflammable and adheres tenaciously to wood or other surfaces. Furthermore the doughy, putty-like plastic composition shrinks less upon setting than other known plastic wood compositions.

The composition given above may be modified, for example, the proportions may be changed, vegetable oils and other plasticizers may be added. Instead of wood flour, other fillers such as cotton linters, bagasse, ground vegetable wastes such as seed hulls, shells, stalks or pith, waste paper or other paper, ground leather, ground cork and bark of various descriptions may be employed. If a less resilient product is required, for example, as a crack filler, mineral fillers such as talc or asbestos may be used instead of all or a portion of the fillers herein enumerated. As a general rule the limits recommended for the composition are approximately as follows:

| | Parts by weight |
|---|---|
| Paracoumarone resin | 2 to 5. |
| Chlorinated rubber or other resin which dries quickly from a solution thereof to form a hard tough mass | 1 to 4. |
| Toluol or other solvent | 3 to 15. |
| Wood flour, or other filler | ½ to 15 (depending on specific gravity and fineness of filler used). |

It is to be understood that this invention is not restricted to the present disclosure otherwise than as defined by the appended claims.

What is claimed is:

1. A self-hardening plastic composition of matter comprising from 2 to 5 parts by weight of paracoumarone resin-like material selected from the group consisting of paracoumarone resin and petroleum resin, from 1 to 4 parts by weight of chlorinated rubber, from 3 to 15 parts by weight of volatile solvent for said paracoumarone resin-like material and chlorinated rubber and a sufficient amount of solid, finely divided filler to impart to said composition a doughy, putty-like consistency.

2. A self-hardening, doughy, putty-like, plastic composition consisting of 2 to 5 parts by weight of paracoumarone resin having a melting point of from about 125° to 160° C., 1 to 4 parts by weight of chlorinated rubber, 3 to 15 parts by weight of toluol, and ½ to 15 parts by weight of wood flour.

JOHN A. KENNEY.